UNITED STATES PATENT OFFICE 2,443,003

ORGANIC FLUORINE-CONTAINING SULFUR COMPOUNDS AND METHODS FOR THEIR PREPARATION

William E. Hanford, Easton, Pa., assignor to E. I. du Pont de Nemours & Company, Wilmington, Del., a corporation of Delaware No Drawing. Application December 11, 1944, Serial No. 567,776

15 Claims. (Cl. 260—607)

This invention relates to the preparation of fluorinated organic compounds and to new organic fluorine compounds. More particularly, the invention comprises a new process for the preparation of polyfluoro organic compounds and includes new chemical products consisting of saturated organic compounds containing one or more fluoroethylene groups per molecule.

This invention is a continuation-in-part of copending application Serial No. 484,300, filed April 23, 1943, now abandoned, the disclosure of which is hereby incorporated herein.

Much work has been directed toward developing a good method for preparing highly fluorinated organic compounds. It has previously been proposed to produce organic fluorine compounds by the reaction of fluorine with various organic materials. Prior investigations have shown that this reaction of fluorine is extremely energetic and generally causes pyrolysis of the organic material, resulting in the formation of carbon, tar or other undesirable carbonaceous decomposition products.

Heretofore, the only practical method for preparing fluorine containing organic compounds has been to replace chlorine or bromine with fluorine by means of various inorganic reagents, such as hydrogen fluoride, silver fluoride, antimony fluorides, mercuric fluoride and other metallic fluorides. However, such processes involve considerable expense and are very restricted in application.

It is an object of this invention to provide a new process for the preparation of saturated organic polyfluoro compounds. Another object of this invention is to obtain new compositions of matter consisting of fluorinated organic compounds. Still another object is to prepare fluoro organic compounds which have extreme stability and inertness. A further object is to provide a relatively simple and inexpensive process for readily preparing saturated organic compounds containing one or more tetrafluoroethylene groups per molecule. A still further object is to obtain saturated organic fluorinated compounds possessing many novel and useful properties. Other objects will appear hereinafter.

These and other objects and advantages are accomplished according to the herein-described invention which broadly comprises heating, at a temperature within the range of from 75° C. to 350° C., an organic sulfur compound, which is free from non-aromatic unsaturation and in which the sulfur has a valence of 2, with a completely halogenated fluoroethylene containing at least 2 fluorine atoms, the remaining halogen atoms, if any, therein being chlorine atoms, i. e., with a compound having the general formula

wherein the $x$ substituents are of the group consisting of fluorine and chlorine atoms at least 2 of said substituents being fluorine atoms.

In a more restricted embodiment this invention comprises heating tetrafluoroethylene, at a temperature within the range of from 100° C. to 250° C., with an aliphatic, including cycloaliphatic, organic sulfur compound of the group consisting of thiols, sulfides and disulfides containing a total of from 1 to about 8 carbon atoms, said heating being preferably effected in a closed system in the presence of a peroxy catalyst. There are thus obtained saturated polyfluoro organic compounds in which each molecule of the thiol, sulfide or disulfide is chemically combined with from 1 to 25 molecules of tetrafluoroethylene.

A preferred embodiment of this invention comprises heating tetrafluoroethylene at a temperature within the range of from 100° C. to 250° C. with an aliphatic thiol containing a total of from 1 to 8 carbon atoms, said heating being effected in a closed system in the presence of from 0.001% to 10%, calculated on the basis of the weight of the reactants, of benzoyl peroxide.

By the expression "organic compound free from non-aromatic unsaturation," as used herein and in the appended claims, is meant an organic compound which is free from non-aromatic carbon to carbon multiple bonds, i. e., a double or triple bond linking two adjacent carbon atoms, other than those which are present in an aromatic ring, e. g., a benzene nucleus.

The term "cycloaliphatic" is of course synonymous with alicyclic.

The method for carrying out the reactions varies to some extent with different types of sulfur-containing organic compound, but the usual procedure comprises placing a given amount of reactants in a stainless steel or silver-lined high pressure reaction vessel with or without a catalyst and then closing and heating to the desired reaction temperature while mechanically agitating the reaction vessel for several hours.

In order to prepare the products of this invention, it is usually desirable to carry out the reaction under pressure at elevated temperatures. The temperature at which the reaction is effected may be varied over a wide range, depending largely upon the nature of the reactants, the catalyst, the results desired and other conditions of the reaction. However, the temperature should be below that at which decomposition or pyrolysis of either the reactants or products occurs. No appreciable reaction is obtained below 75° C. and it is usually necessary to heat the reaction mixture to 100° C. or higher in order to obtain a substantial reaction in a reasonable time. The preferred temperature range is 100° to 250° C. but temperatures as high as 350° C. are sometimes desirable.

A series of products can be obtained which vary from liquids to solids depending upon the number of fluoroethylene units per molecule. The products are highly fluorinated saturated low molecular weight organic compounds containing one or more units of the fluoroethylene per molecule. The products vary from liquids which are compatible with the common organic solvents to solids which have limited solubility or are insoluble in most solvents.

The invention is further illustrated by the following examples in which the parts are by weight unless otherwise specified.

*Example I*

One hundred and forty parts of ethyl mercaptan, 50 parts of tetrafluoroethylene and 1.5 parts of benzoyl peroxide were heated under pressure for 8 hours at 110° C. The reaction mixture was distilled through an efficient fractionating column to remove the unreacted ethyl mercaptan. About 25 parts of liquid products were obtained and the main fraction, B. P. 86°–88° C., corresponded to the 1:1 ($C_2F_4/C_2H_5SH$) product.

|  | F Per Cent | S Per Cent | C Per Cent | H Per Cent |
|---|---|---|---|---|
| Analysis | 44.89 | 20.58 | 31.11 | 4.15 |
| Calculated for $C_4F_4H_6S$ | 46.9 | 19.75 | 33.8 | 4.23 |

Liquid products boiling up to 150° C. and a solid product were also obtained. These products are believed to be higher molecular weight analogs of the 1:1 product and to correspond to the general formula $H(CF_2CF_2)_nC_2H_4SH$, wherein $n$ is a positive integer within the range of from 1 to 25.

*Example II*

Twenty-four parts of dimethyl disulfide, 30 parts of tetrafluoroethylene and a trace of iodine were charged into an autoclave and heated for 4 hours at 175° C. The reaction products consisted of considerable steam-volatile oil and a solid product (M. P. about 113°–116° C.) (S=5.82%). Calculated for $(CF_2CF_2)_{10}/CH_3SSCH_3$: $S=5.85\%$ The steam-volatile oil is a mixture of lower molecular weight analogs. It is believed that these products have a structure corresponding to the following formula: $CH_3S(CF_2CF_2)_nSCH_3$, wherein $n$ is a positive integer of not more than 25.

As hereinbefore stated, this invention comprises heating, at a temperature within the range of from 75° C. to 350° C., a completely halogenated fluoroethylene containing at least two fluorine atoms, the remaining halogen atoms, if any being chlorine atoms, with an aliphatic, including cycloaliphatic, organic compound containing bivalent sulfur and which is free from non-aromatic unsaturation.

Among the completely halogenated fluoroethylenes which are operative in the process of this invention are tetrafluoroethylene, chlorotrifluoroethylene, 1,1-dichloro-2,2-difluoroethylene and 1,2-dichloro-1,2-difluoroethylene. The process is particularly applicable to tetrafluoroethylene which reacts the most readily and is therefore preferred.

While all organic compounds which contain bivalent sulfur and which are free from non-aromatic unsaturation are operative in my novel process, products having the most desirable properties are had when the organic sulfur compound reacted with the fluoroethylene is an aliphatic, including cycloaliphatic, thiol, sulfide or disulfide, and especially is a compound of the group consisting of aliphatic thiols, sulfides and disulfides containing a total of from 1 to about 8 carbon atoms. Included among examples of such organic sulfur compounds are aliphatic, including cycloaliphatic, thiols, such as methyl mercaptan, ethyl mercaptan, butyl mercaptan, octyl mercaptan, ethanedithiol, 3-methylcyclohexyl mercaptan and the like; aliphatic, including cycloaliphatic, sulfides, such as dimethyl sulfide, diethyl sulfide, dibutyl sulfide, methyl cyclohexyl sulfide and the like; and aliphatic, including cycloaliphatic, disulfides, such as dimethyl disulfide, dibutyl disulfide, and the like.

Although a mixture of organic sulfur compounds as hereinbefore defined may be employed in this invention, it is preferable to use a single organic sulfur compound. It is also preferable that the reactants be substantially anhydrous and that the reaction be carried out in a substantially anhydrous condition. Generally, a relatively large molar excess of the organic sulfur compound is used as compared to the fluoroethylene in order to prepare low molecular weight products. However, the desired products may often be obtained by using a relatively small amount of organic sulfur compound since the molar ratio of the fluoroethylene to the organic sulfur compound in the products varies from 1 to about 25 depending upon the conditions. Usually the molar ratio of organic sulfur compound to the fluoroethylene in the reaction mixture may vary from about 0.04:1 to 20:1, but it is preferable to work in the range 1:1 to 10:1 in order to obtain the desired low molecular weight products in highest yield.

As previously stated, appreciable effects are had when the reactants are heated at a temperature as low as about 75° C., while a temperature just short of that at which decomposition of the reactants and/or products occurs may be employed. However, maximum yields are obtained with least difficulty at temperatures within the range of from about 100° C. to 250° C.

It is often desirable to use a catalyst although a catalyst is not always necessary. A wide variety of catalysts are operable including organic and inorganic peroxy compounds, basic catalysts, various acid catalysts, oxygen, ozone and iodine. Examples of peroxy catalysts are diacyl peroxides, such as benzoyl peroxide and lauroyl peroxide; alkyl peroxides, such as diethyl peroxide; inorganic peroxides, such as sodium peroxide, barium peroxide and hydrogen peroxide; salts of peracids, such as ammonium persulfate, sodium perborate and potassium percarbonate. Examples of basic catalysts for use in this invention are sodium alcoholate, borax, potassium cyanide, disodium phosphate, trimethylamine oxide, hexachloroethane-borax, hydrazine, hydramine salts and peroxide-borax. Among the acid catalysts which may be used in this invention are Friedel-Crafts catalysts, such as aluminum chloride, zinc chloride, ferric chloride and boron fluoride; and chloroamine-T, sulfuric acid, phosphoric acid and hydrogen fluoride.

The proportion of catalyst may vary within relatively wide limits depending largely upon the nature of the reactants and products desired. Although efficient reaction may be effected without the use of catalysts, it is generally preferred to employ a catalyst in this invention. Furthermore, the use of small amounts of catalyst reduces the time, temperature and cost of operation. Highly desirable results may be obtained with the use of an amount of catalyst corresponding to about .001 to 10% by weight of the reactants employed. Advantageous results are sometimes obtained by using a combination of catalysts.

It will be understood that the operating conditions may vary widely depending upon the nature of the compound being reacted and also upon the results desired. However, the reactants should be substantially anhydrous and the reaction should be effected under substantially anhydrous conditions. The time required for carrying out the reaction may vary from a few minutes to several days depending upon the nature of the reactants and the other operating conditions such as temperature, pressure and catalyst.

The process may be operated continuously or intermittently. The reaction may be carried out in a closed system or the reaction may be carried out in the vapor phase by mixing the vapors of the organic sulfur compound and the fluoroethylene and passing the mixture of vapors through a hot reaction tube which, if desired, may contain a catalyst. In general, the reaction may be carried out under atmospheric or superatmospheric pressure in the range of 1 to 1000 atmospheres. The preferred pressure range is 1 to 200 atmospheres.

The reaction may be carried out in any suitable reaction vessel, such as stainless steel, iron, silver, aluminum, and other metals and alloys which are capable of withstanding heat and pressure. The reaction is preferably carried out with agitation, but agitation is not always necessary.

The present invention is useful for the production of a wide variety of organic fluorine compounds. Although it is understood that often a mixture of compounds with varying ratios of fluoroethylene units per molecule of organic sulfur compound is obtained, the mixture can generally be separated into various definite fractions by various methods, such as steam distillation, fractional distillation, filtration, extraction, fractional crystallization, or by chemical methods. Products with a given ratio of fluoroethylene can often be prepared by the proper choice of conditions and catalyst. A high yield of products having a 1:1 ratio of fluoroethylene to organic sulfur compound frequently can be obtained by using selected conditions.

The products had in accordance with the process of this invention contain from 1 to 25 fluoroethylene molecules chemically combined with one molecule of the sulfur compound reacted therewith. In most instances the products obtained contain a mixture of individual components containing from 1 to 25 fluoroethylene units per molecule. Said individual components can be separated from one another by conventional methods such as fractional distillation and crystallization. Of the products obtained in this manner those containing from 1 to about 15 fluoroethylene molecules chemically combined with one molecule of a lower aliphatic thiol are most readily obtained and are therefore preferred. Products in which the mole ratio of fluoroethylene to sulfur compound is within the range of from 1:1 to 5:1 have optimum properties.

The products can be distinguished readily from the polymerized fluoroethylene, i. e., the fluoroethylene homopolymer, by their analysis, by their physical properties and often by their chemical reactions. The products of this invention vary from liquids to relatively low molecular weight solid products which usually soften or melt below 300° C. when heated in air on a copper block. The liquid products are generally compatible with the common organic solvents and considerable amounts of the solid products are also soluble in organic solvents. The presence of the saturated non-polymerizable organic reactant in the products of this invention can often be shown by the analysis and chemical reactions of the products.

The reaction and the separation or isolation of the products may be carried out simultaneously or in separate steps. The products may be separated by filtration, extraction, distillation or crystallization depending upon the nature of the products.

The products of this invention are useful for various commercial purposes. Since many of the products of this invention are extremely stable, they are generally applicable for use as solvents, reaction media, lubricants and dielectrics. Many of the products have been found to be very desirable in that they are substantially non-flammable, non-corrosive and non-toxic. Substituted fluoro carbons having outstanding thermal and chemical stability can be prepared according to the present invention. This invention is particularly advantageous in that it affords a safe, flexible, practical and economical method of producing highly fluorinated saturated organic products. One of the advantages of the invention is that the process may be operated with none or a relatively small amount of catalyst and the reaction proceeds smoothly and easily.

This is a continuation-in-part of U. S. application Serial No. 484,300, filed April 23, 1943, disclosing the generic invention further disclosed and claimed in its generic aspects in copending application Serial No. 567,778, filed of even date herewith by me, William E. Hanford, and Robert M. Joyce, Jr., further specific aspects of which, namely, the process for obtaining organic fluorine-containing alcohols by heating tetrafluoroethylene in the presence of oxygen, ozone or a peroxy catalyst at a temperature of at least 75° C. and below that at which pyrolysis occurs, with an organic alcohol which is free from non-aromatic unsaturation and contains an aliphatic, including cycloaliphatic, carbon atom attached to three atoms other than fluorine, and in which a carbon atom bearing a hydroxyl group has a hydrogen atom directly attached thereto, are the sole invention of and are claimed by Robert M. Joyce, Jr., in copending application Serial No. 567,777, filed of even date herewith which discloses and claims the process for obtaining organic fluorine-containing alcohols by heating, in the presence of oxygen, ozone or a peroxy catalyst at a temperature of at least 75° C. and below that at which pyrolysis occurs, a haloethylene having the general formula

wherein the X substituents are halogen atoms having an atomic weight of less than 40 and at least two of said X substituents are fluorine atoms, with an alcohol which is free from non-aromatic unsaturation and in which a carbon atom bearing a hydroxyl group has a hydrogen atom directly attached thereto.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful.

1. The process for obtaining organic fluorine-containing sulfur compounds which comprises heating a haloethylene having the general formula $X_2C=CX_2$ wherein the X substituents are halogen atoms having an atomic weight of less than 40 and at least two of said X substituents are fluorine atoms with an organic compound containing a total of not more than eight carbon atoms, selected from the class consisting of saturated hydrocarbon sulfides, disulfides and thiols, said heating being effected at a temperature of at least 75° C. and below that at which pyrolysis occurs, the molar ratio of the aforesaid organic sulfur compound to the aforesaid haloethylene being within the range of about 1:1 to about 10:1.

2. The process for obtaining organic fluorine-containing sulfur compounds which comprises heating a haloethylene having the general formula $X_2C=CX_2$ wherein the X substituents are halogen atoms having an atomic weight of less than 40 and at least two of said X substituents are fluorine atoms with a saturated hydrocarbon thiol containing not more than eight carbon atoms, said heating being effected under a pressure of at least one atmosphere at a temperature within the range of from 75° C. to 350° C., the molar ratio of the aforesaid thiol to the aforesaid haloethylene being within the range of about 1:1 to about 10:1.

3. The process for obtaining organic fluorine-containing sulfur compounds which comprises heating a haloethylene having the general formula $X_2C=CX_2$ wherein the X substituents are halogen atoms having an atomic weight of less than 40 and at least two of said X substituents are fluorine atoms with a saturated hydrocarbon sulfide containing a total of not more than eight carbon atoms, said heating being effected under a pressure of at least one atmosphere at a temperature within the range of from 75° C. to 350° C., the molar ratio of the aforesaid sulfide to the aforesaid haloethylene being within the range of about 1:1 to about 10:1.

4. The process for obtaining organic fluorine-containing sulfur compounds which comprises heating a haloethylene having the general formula $X_2C=CX_2$ wherein the X substituents are halogen atoms having an atomic weight of less than 40 and at least two of said X substituents are fluorine atoms with a saturated hydrocarbon disulfide containing a total of not more than eight carbon atoms, said heating being effected under a pressure of at least one atmosphere at a temperature within the range of from 75° C. to 350° C., the molar ratio of the aforesaid disulfide to the aforesaid haloethylene being within the range of about 1:1 to about 10:1.

5. The process for obtaining organic fluorine-containing sulfur compounds which comprises heating tetra-fluoroethylene with a saturated hydrocarbon thiol containing not more than eight carbon atoms, said heating being effected in the presence of a peroxy catalyst under substantially anhydrous conditions under a pressure within the range of from 1 atmosphere to 1000 atmospheres, at a temperature within the range of from 100° C. to 250° C., the molar ratio of the aforesaid thiol to the aforesaid tetrafluoroethylene being within the range of about 1:1 to about 10:1.

6. The process for obtaining organic fluorine-containing sulfur compounds which comprises heating tetra-fluoroethylene with a saturated hydrocarbon sulfide containing a total of not more than eight carbon atoms, said heating being effected in the presence of a peroxy catalyst under substantially anhydrous conditions under a pressure within the range of from 1 atmosphere to 1000 atmospheres, at a temperature within the range of from 100° C. to 250° C., the molar ratio of the aforesaid sulfide to the aforesaid tetrafluoroethylene being within the range of about 1:1 to about 10:1.

7. The process for obtaining organic fluorine-containing sulfur compounds which comprises heating tetrafluoroethylene with a saturated hydrocarbon disulfide containing a total of not more than eight carbon atoms, said heating being effected under substantially anhydrous conditions under a pressure within the range of from 1 atmosphere to 1000 atmospheres, at a temperature within the range of from 100° C. to 250° C., the molar ratio of the aforesaid disulfide to the aforesaid tetrafluoroethylene being within the range of about 1:1 to about 10:1.

8. The process for obtaining organic fluorine-containing sulfur compounds which comprises heating tetrafluoroethylene with ethyl mercaptan at a temperature within the range of from 100° C. to 250° C., the mole ratio of said ethyl mercaptan to said tetrafluoroethylene being within the range of from 1:1 to 10:1, said heating being effected under substantially anhydrous conditions at a pressure within the range of from 1 atmosphere to 200 atmospheres in the presence of an amount of benzoyl peroxide within the range of from 0.001% to 10.% of the combined weight of said tetrafluoroethylene and ethyl mercaptan.

9. The process for obtaining organic fluorine-containing sulfur compounds, which comprises heating tetrafluoroethylene with dimethyl disulfide at a temperature within the range of from 100° C. to 250° C., the mole ratio of said dimethyl disulfide to said tetrafluoroethylene being within the range of from 1:1 to 10:1, said heating being effected under substantially anhydrous conditions at a pressure within the range of from 1 atmosphere to 200 atmospheres in the presence of an amount of iodine within the range of from 0.001% to 10.0% of the combined weight of said tetrafluoroethylene and dimethyl disulfide.

10. A saturated organic fluorine-containing sulfur compound obtained according to the process set forth in claim 1.

11. A saturated organic fluorine-containing sulfur compound obtained according to the process set forth in claim 5.

12. A saturated organic fluorine-containing sulfur compound obtained according to the process set forth in claim 6.

13. A saturated organic fluorine-containing sulfur compound obtained according to the process set forth in claim 7.

14. A saturated organic fluorine-containing sulfur compound obtained according to the process set forth in claim 8.

15. A saturated organic fluorine-containing sulfur compound obtained according to the process set forth in claim 9.

WILLIAM E. HANFORD.

REFERENCES CITED

The following references are of record in the file of this patent:

UNITED STATES PATENTS

| Number | Name | Date |
|---|---|---|
| 2,216,044 | Patrick | Sept. 24, 1940 |
| 2,230,654 | Plunkett | Feb. 4, 1941 |

FOREIGN PATENTS

| Number | Country | Date |
|---|---|---|
| 110,457 | Austria | Jan. 17, 1936 |
| 796,026 | France | Jan. 17, 1936 |

OTHER REFERENCES

Mayo et al., "Chemical Reviews," 1942, vol. 27, pages 388–394.